Feb. 25, 1930.  W. R. PETERSON  1,748,393
TRACTOR DISK HARROW
Filed Dec. 31, 1927  2 Sheets-Sheet 1
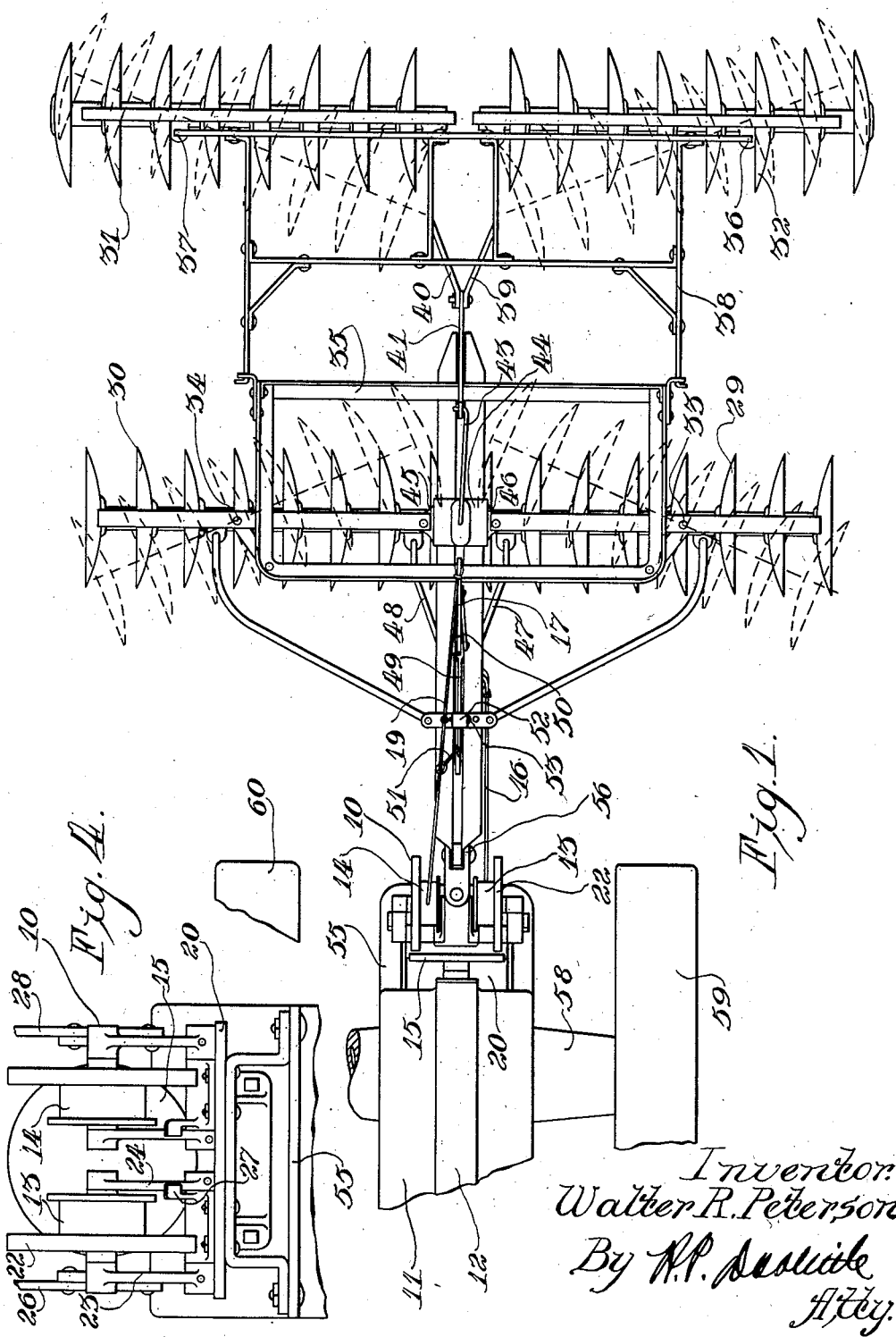

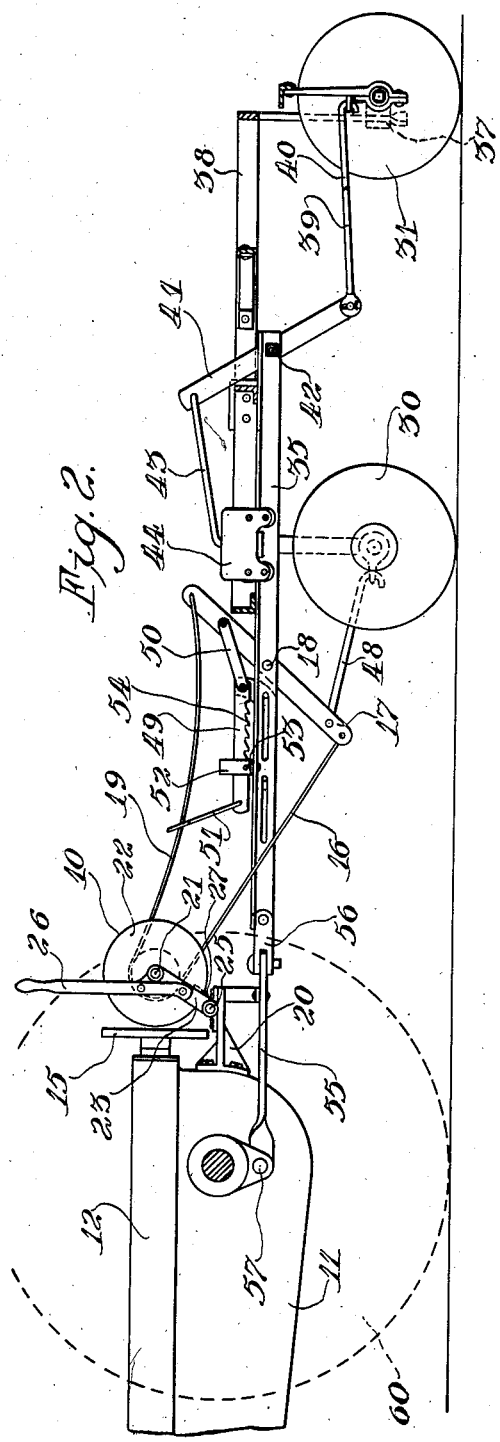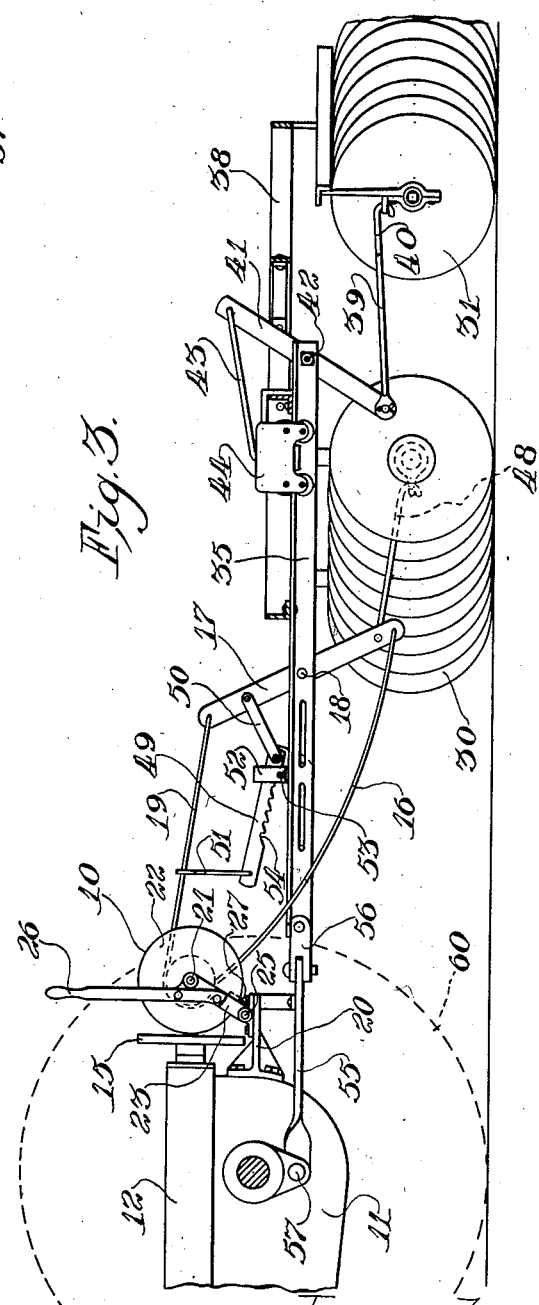

Patented Feb. 25, 1930

1,748,393

UNITED STATES PATENT OFFICE

WALTER R. PETERSON, OF PARK RIDGE, ILLINOIS, ASSIGNOR TO INTERNATIONAL HARVESTER COMPANY, A CORPORATION OF NEW JERSEY

TRACTOR DISK HARROW

Application filed December 31, 1927. Serial No. 243,834.

This invention presents improvements in power farming equipment, and more particularly improvements in a combination of an implement and tractor having novel power operated mechanism for desirably controlling work performing parts of the implement.

An object of the invention is to provide a novel combination of an implement and a tractor, the tractor and implement being provided with novel mechanism for controlling work performing parts of the implement arranged upon the tractor and adapted to be operated by the source of power which operates the tractor.

Another object of the invention is to provide a tandem disk harrow having novel mechanism cooperating with a controller mounted upon a tractor and operable by the power take-off of the tractor for angling and straightening the gangs of the harrow. Other objects of the invention will appear as the accompanying description proceeds.

An illustrative embodiment of the invention is shown in the accompanying drawings, in which:

Figure 1 is a plan showing a tandem disk harrow combined with a tractor having the selectively operable controller mounted so as to be operable by the tractor power take-off and connected to the movably mounted gangs of the harrow;

Figure 2 is substantially a side elevation of the machine shown in Figure 1;

Figure 3 is a side elevation similar to Figure 2 but showing the gangs of the harrow in angled condition; and Figure 4 is a detail view showing the power take-off operated controller in rear elevation.

The illustrative implement controlled is indicated generally by the numeral 10. It is mounted upon the tractor 11 and arranged to be operated at the will of the attendant by the power take-off 12. In the present instance, the controller comprises two movably mounted winding drums 13 and 14, either one of which may be moved so as to be operated by a friction disk 15 rotatable with the power take-off 12. To one of the winding drums is connected a cable 16, the other end of which is connected to a gang moving lever 17 herein shown as pivoted intermediate its length at 18. When the proper winding drum is operated to wind up the cable 16, the lever 17 is pulled to the position indicated in Figure 2 of the drawings, and the disk gangs are moved to their straightened or transport position, as indicated. When the other winding drum is operated, a cable 19 connected to the other end of the lever 17 is pulled so as to move the gangs to their angled or work performing positions.

The illustrative controller is carried by a support 20 rigidly secured to the body of the tractor 11. As best seen in Figure 4, the winding drum 13 is fixed upon a shaft 21 alongside a friction gear 22. The shaft 21 is rotatably mounted in the upper end of the pivoted arms 23 and 24, these arms being fixed at their lower ends to a shaft 25 rotatably journaled upon the support 20.

Rigid with the arm 23 is a lever 26 by which the operator may move the disk 22 into engagement with the power take-off disk 15 to operate the winding drum. The entire winding drum assembly is so arranged that it will move by gravity away from the disk 15. A fixed stop 27 limits the movement of the winding drum in this direction. The elements for supporting the winding drum 14 are essentially similar to the elements just described for mounting the drum 13, and it is believed that their structure will be apparent from the drawings without further description. This winding drum is selectively controlled by a lever 28 by which the drum 14 may be moved to operative position.

The implement is herein shown as a tandem disk harrow having the angularly movable gangs 29, 30, 31 and 32. The front gangs 29 and 30 are pivoted at 33 and 35 upon a front frame 35. These gangs are movable from their transport positions indicated in full lines in Figure 1 to their work performing positions indicated in dotted lines.

The rear harrow gangs are pivotally connected at 36 and 37 to rear frame 38 and are movable about their pivot points from the indicated full line transport position to the dotted line work performing position.

Rearwardly diverging bars 39 and 40 are pivotally connected to the inner ends of the gangs 31 and 32 for moving those gangs from their full line positions to their dotted line positions. The forward ends of the bars 39 and 40 are connected to a lever 41 preferably pivotally mounted on the front frame 35, as illustrated at 42. Connected to the upper end of the lever 41 is a link 43 which is attached at its forward end to a head block 44 slidable fore and aft along parts of the frame 35. The head block 44 has lateral ears 45 and 46 to which are pivoted the inner ends of the gangs 29 and 30. The inner ends of these gangs are also pivotally connected to forwardly converging links 47 and 48 which are both pivoted to the lower end of the gang moving lever 17.

It will be evident from the above description that rotation of the winding drum 13 so as to exert a pull upon the cable 16 will transmit a forward pull to the inner ends of the gangs 29 and 30, thereby moving those gangs to their straightened or transport positions. It will also be seen that the gangs 31 and 32 are moved to their transport position by reason of the reversing effect of the lever 41.

Pivotally connected to the upper part of the gang moving lever 17 is a locking mechanism for holding the gangs in desired positions. This locking means comprises a ratchet bar 49 pivotally joined to the lever 17 by a link 50. At the forward end of the bar 49 is a short cable 51 secured to the cable 19. Embracing the bar 49 is a fixed guide 52 carrying a locking pin 53 over which the teeth 54 of the locking bar may ratchet when the lower end of the lever 17 is pulled forwardly.

When the winding drum 14 is operated so as to exert a forward pull upon the cable 19, the first effect of the pull on that cable is to straighten it from the position in which it is shown in Figure 2 of the drawings. Pull is then transmitted to the forward end of the bar 49 to lift it from its locking engagement with the pin 53. This unlocking action will be clearly evident from a comparison of Figures 2 and 3 of the drawings. After locking mechanism is released, as disclosed, further pull upon the cable 19 causes the links 47 and 48 to move rearwardly. This movement is transmitted to the inner ends of the front gangs 29 and 30 to move them to their dotted line or work performing positions. Simultaneously the rear gangs 31 and 32 have their inner ends moved forwardly to the work performing positions indicated in Figure 1.

The draft connections by which the illustrative harrow is secured to the tractor include the tractor drawbar 55 and a clevis 56, the former being pivotally connected to the tractor, as indicated at 57. The rear axle of the tractor is illustrated at 58 and is connected to the tractive supports 59 and 60. Preferably the power take-off 12 of the tractor is operated through the transmission and the same source of power which delivers the tractive force.

Although the invention has been described with reference to one particular mechanism, it is to be understood that the invention is not limited thereto, but that it is capable of use in various combinations and sub-combinations, as is indicated by the scope of the sub-joined claims.

What is claimed as new is:

1. A device of the class described comprising, in combination, a tractor having a power take-off, a disk harrow having draft devices connecting it to the tractor, a disk gang movably related to the harrow, gang moving mechanism carried by the harrow, locking means for holding said gang in a predetermined position, a controller arranged to be operated by the power take-off, a connection between the controller and the gang moving mechanism whereby the gang is moved by power derived from the power take-off, and means joining said connection and said locking means for causing movement of the controller in one direction to release said locking means before motion is transmitted to said gang moving mechanism.

2. A device of the class described comprising, in combination, a tractor having a power take-off, an implement having draft transmitting devices connecting it to the tractor, ground working tools connected with the implement and pivoted for angular adjustment in a horizontal plane, devices mounted on the implement for adjusting said parts relative to the implement, a winding drum mounted on the tractor, a cable connecting one of said devices and the winding drum, friction gearing connecting the power take-off and winding drum, and manually operable means movable at the will of the operator to operatively relate the parts of said friction gearing to actuate the adjusting mechanism.

3. A device of the class described comprising, in combination, a tractor having a power take-off, a tandem disk harrow having draft connections with the tractor, a plurality of angularly adjustable disk gangs carried by the harrow, means on the harrow for angling said gangs to and from their working positions, a manually governed controller for the angling means carried by the tractor and subject to operative connection with the power take-off, manually operable means for establishing operative connection between the controller and the power take-off, and a power transmitting connection between said controller and said gang angling means for transmitting gang angling movements from the power take-off to the harrow.

4. A device of the class described comprising, in combination, a tractor having a power take-off, a disk harrow having draft transmitting devices connecting it to the tractor, angularly adjustable disk gangs on the harrow, devices mounted on the harrow for angling said gangs, a pair of winding drums movaly mounted on the tractor, a gang angling mechanism, cables connecting said gang angling mechanism and the respective winding drums, friction gearing operatively connecting the power take-off and winding drums, and manually operable means movable at the will of the operator for selectively moving the drums into actuating relation to said friction gearing to effect reverse angling movements of the gangs.

In testimony whereof I affix my signature.

WALTER R. PETERSON.